INVENTOR:
Dale E. Wiltrout by Sparrow and Sparrow

ATTORNEYS.

INVENTOR:
Dale E. Wiltrout by Sparrow and Sparrow

ATTORNEYS.

United States Patent Office 3,491,234
Patented Jan. 20, 1970

3,491,234
ULTRAVIOLET IRRADIATION
DETECTION SYSTEM
Dale E. Wiltrout, Wyckoff, N.J., assignor to Ultra Dynamics Corporation, Paterson, N.J., a corporation of Delaware
Filed July 10, 1967, Ser. No. 652,141
Int. Cl. H01j 37/00; G01n 23/12
U.S. Cl. 250—43.5                     5 Claims

ABSTRACT OF THE DISCLOSURE

A monitoring and metering circuit for detection of the content of ultraviolet irradiation in a liquid purification system wherein an ultraviolet detector peaked in the substantially 2537 angstroms wave length area produces a pulsed signal and feeds the signal to a unijunction transistor amplifier and thereafter the signal is fed to a pair of matched transistor amplifiers operating in push-pull, the output therefrom then fed to a metering circuit for determining the irradiation level content in the fluid.

Another circuit comparable to the above produces an output which is fed to another threshold amplifier which is so biased that the output therefrom will be a fixed value, which is indicative of the system operating normally. Any deviation from the norm produces an output signal designed to trip an output relay system so as to permit audible and visible indicators to show mal-function or irradiation ultraviolet content is not normal. The relay further permits the functioning of an auxiliary power source to restore the system to its normal function where the main source is non-functioning or mal-functioning.

---

This invention relates to a detection system for monitoring and measuring the intensity of a germicidal ultraviolet source in micro-watts per square centimeter.

CROSS-REFERENCES AND BACKGROUND OF INVENTION

Water purification by ultraviolet irradiation is known, and apparatus for both applying such irradiation and the monitoring thereof is shown in U.S. Patent No. 3,182,193, dated May 4, 1965 and application entitled "Ultraviolet Fluid Purifier," Ser. No. 572,644, filed July 29, 1966. The instrumentation for monitoring the ultraviolet irradiation content in the liquid to be purified must be reliable, accurate, fail-safe, easily checked and calibrated for proper protection and efficiency of the purification system. The meter should be a precision instrument engineered and designed to measure and monitor the intensity of the germicidal ultraviolet source, a sensitive, filtered and calibrated instrument and serve a useful need in the measurement and control of the proper intensities required for effective killing power.

SUMMARY OF THE INVENTION

The present invention is directed at achieving these objectives and consists in such novel features, construction arrangements, combination of parts and elements and improvements as many be shown and described in connection with the apparatus and circuitry herein disclosed and describes by way of example only as illustrative of preferred embodiments.

An ultraviolet light irradiation detection system is provided for monitoring and measuring ultraviolet irradiation in a fluid undergoing purification in which an electron discharge device is in proximity to the fluid and is responsive to ultraviolet irradiation for producing electrical signals indicative thereof, means being provided for receiving an amplifying said electrical signals to a predetermined level indicative of the normal ultraviolet irradiation content in said fluid, and for receiving and recording the amplified signals; and in which means responsive to signal deviation from said predetermined norm signal levels are provided for producing audible and visual indications indicative of non-normal ultraviolet light irradiation content in the fluid undergoing purification, and for restoring the system to its normal functioning capability.

The signal deviation means, as an embodiment may further comprise a relay load circuit consisting of a relay connected amplifier biased at a level comparable to the desired normal signal and disposed when the signal is not normal to trip the relay and permit visual and audible indicators to function accordingly; also with the relay further disposed so as to interpose an auxiliary power supply source in response to the signal deviation for restoring the system to its normal operating capability.

Various further and more specific purposes, features and advantages will clearly appear from a detailed description to be given below when taken in connection with the accompanying drawings which form part of this specification and illustrate merely by way of example embodiments of the invention.

BRIEF DESCRIPTION OF THE DRAWING

In the following description, parts will be identified by the same reference numeral where they are similar and perform the same function, as shown in the several figures of the drawings in which.

DESCRIPTION OF THE PREFERRED EMBODIMENTS

Figure 1:
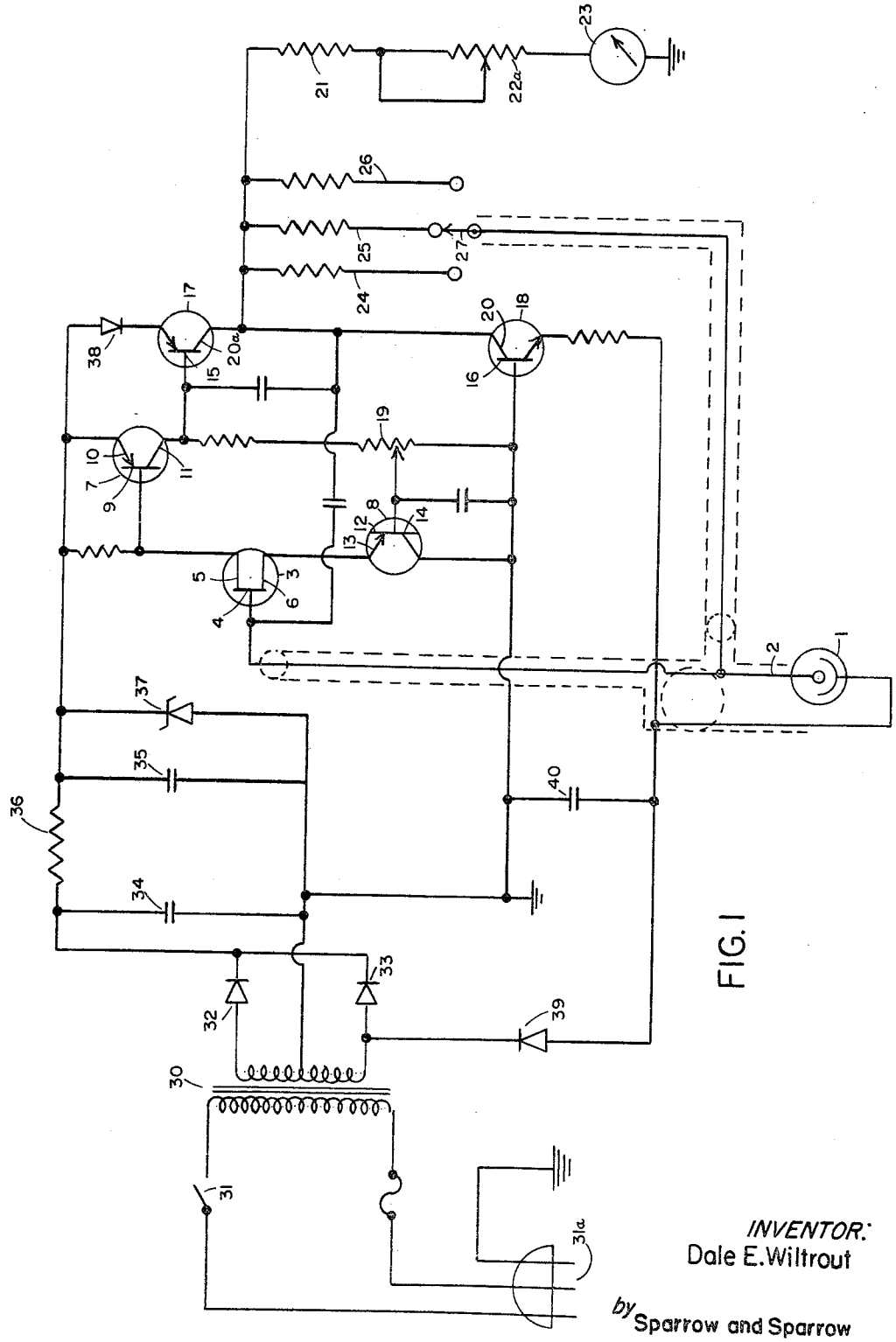
FIG. 1 is a circuit diagram of the ultraviolet ray monitoring system according to the invention.

Referring now in more detail to the drawings illustrating preferred embodiments by which the invention may be realized there is shown in FIG. 1 an electronic monitoring system for monitoring and measuring the irradiation content of ultraviolet rays radiating from treated water for purification purposes and comprises an ultraviolet detection or sensing unit indicated by the reference numeral 1 responsive to ultraviolet irradiation and especially peaked to develop a maximum pulse-like signal or response at approximately a wavelength of 2537 angstroms. The said detection unit 1 is placed in proximity to an irradiation source of the type described in the aforementioned references and is disposed, when excited by the irradiated ultraviolet rays, to develop a pulse-like signal. The detection unit has a very narrow band pass characteristic in that a sharp-like pulse signal will only be developed in the area of 2537 angstroms, and that light irradiation above and below this level will produce very low levels of signals. The purification system presupposes for proper performance that the ultraviolet light, to which the fluid to be purified is applied, must reach a certain level as measured by the irradiated light detected. That when this level is not maintained, e.i., the 2537 angstrom level, a defect in the system is apparent. By suitable monitoring and detection such defects may be obviated.

The output signal from detector 1 is passed along shielded conductor 2 to a unijunction type transistor amplifier 3, the said amplifier having an emitter 4 to which the detector signal is applied, and a pair of base electrodes 5 and 6. The unijunction amplifier amplifier has inherent qualities such as a stable firing voltage which is a fixed fraction of the applied interbase voltage, a very low value of firing current, is very stable, and has a high current capability. Such qualities make it very desirable where low sensing voltages, such as the type developed by detector unit 1 in the system under consideration herein.

The signal outputs of amplifier 3 are thereafter passed along to transistor amplifiers 7 and 8, each having, respectively, base, emitter and collector electrodes 9, 10, 11, and 12, 13, 14. The collector outputs from amplifiers 7 and 8 are thereafter applied to the base electrodes 15, 16 of transistor amplifiers 17 and 18, respectively. A variable resistor 19 in the base circuit of amplifier 8, permits the adjustment of the base bias, and thus controls the amplitude of the output signal from the said amplifier. This control adjustment permits the signal inputs to amplifiers 17 and 18 to be equal, although their polarities are opposite. This polarity reversal came about by feeding the unijunction amplifier stage 3 outputs to the base 9 and emitter 13 of amplifiers 7 and 8, respectively.

The amplifier stages 17 and 18 now operating in push-pull, have their collector electrodes 20, 20a commonly connected to an output metering load circuit comprising resistor 21, adjustable resistor 22, and meter 23. Shunting the metering circuit are a combination of shunt load resistors 24, 25, 26, each disposed to permit the meter to operate at different levels of sensitivity, as selected by switch 27, dependent upon adjustments made in the detection circuit, where different levels of ultraviolet irradiation are to be noted and/or monitored. Resistor 22 is for the purpose of zero setting of the meter under quiescent conditions to assure that the meter will accurately measure the ultraviolet light irradiation level of the water being purified.

The power source for providing the various biasing potentials to the amplifier electrodes is shown in FIG. 1 and includes a step-down power-transformer 30 whose primary is connected to a source of AC voltage through a power-switch 31, connected to a three-prong input plug 31a, and whose secondary drives a pair of back-to-back diodes 32, 33 to achieve full-wave rectification. A filter is provided which comprises capacitors 34, 35 shunting a bridging resistor 36 and a voltage regulator diode 37, (a Zener-diode) and a stabilizing diode 38, all necessary for providing a positive source of DC voltage which is stable, constant and well-regulated. A further source of negative voltage is provided by an additional diode 39 suitably polarized and filtered by capacitor 40.

Figure 2:
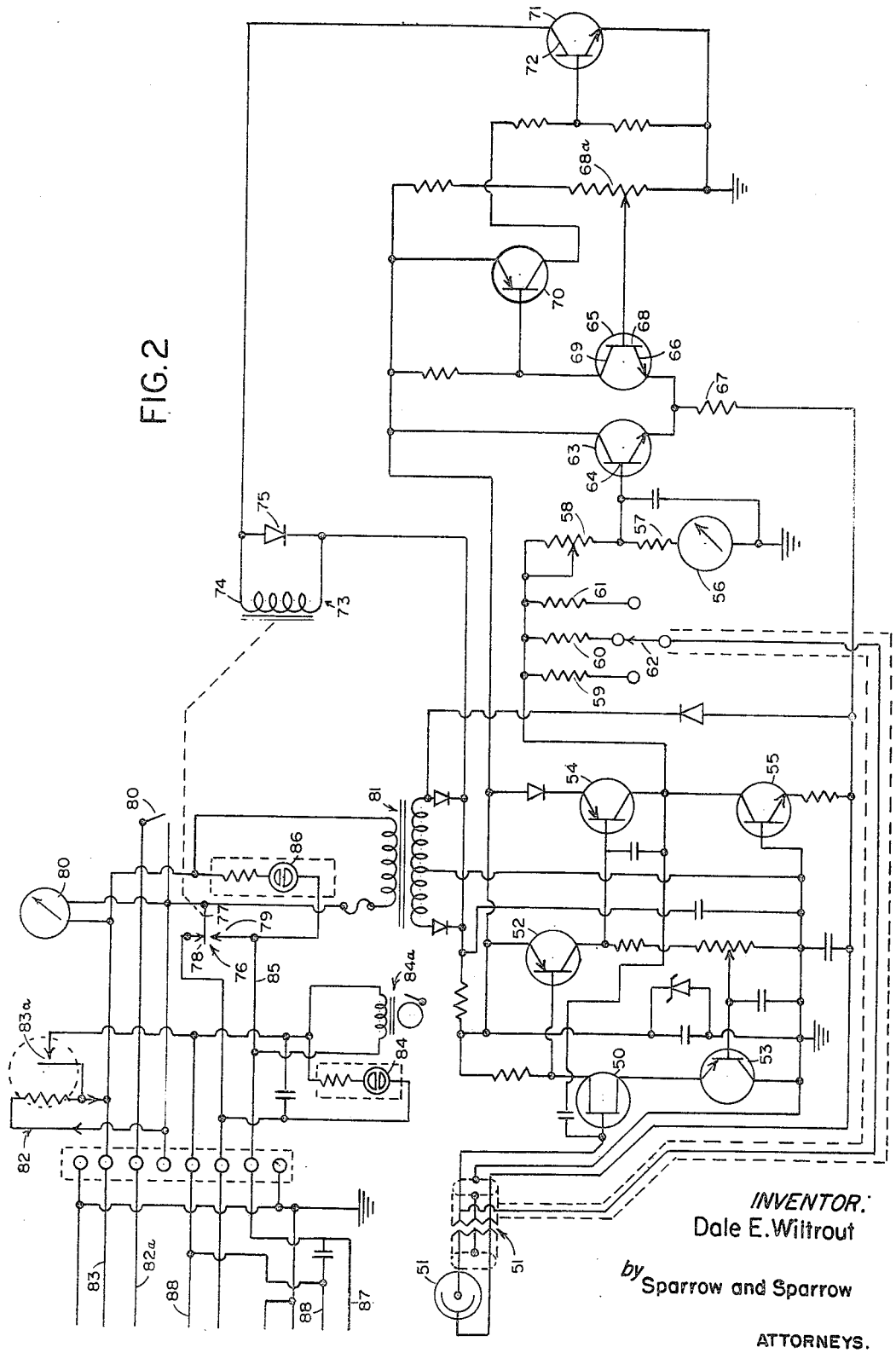
FIG. 2 is a circuit diagram of monitoring system according to another embodiment of the invention and provides features for reliable and continuous operation in the presence of power failure and/or abnormal irradiation ultraviolet content in the fluid undergoing purification.

In FIG. 2 another meter monitoring circuit is provided according to another preferred embodiment of the invention and it involves the same preliminary amplifying stages embodied in FIG. 1 and has, in addition thereto, circuitry for automatically sounding an alarm system when the ultraviolet light irradiation level in the liquid to be purified deviates from the accepted level as predetermined from standards set for purification. Further, the circuitry provided is comparable to a "fail-safe" system in that if there is a power failure, or if the power system deviates from the norm, i.e., where the load currents and voltages are poorly regulated causing disturbances in the line voltages and currents, the systems will continue to function and provide accurate and instantaneous monitoring and metering of the ultraviolet irradiation level. The circuit comprises, as in FIG. 1, a pre-amplifier stage 50 for receiving an input impulse from ultraviolet irradiation detector 51 connected by cable 51a and transmitting therefrom a pair of amplified signals to amplifier stages 52 and 53. The outputs from these stages feed a pair of transistor stages 54 and 55 connected in push-pull for delivery to a common load circuit comprising a meter 56 and load resistors 57 and 58. Shunted across the meter are shunt resistors 59, 60 and 61, each selectively chosen by switch 62 for purposes of changing the meter measuring ranges. The foregoing is substantially equivalent to the circuitry of FIG. 1.

Across load resistor 57, a connection is made and the voltage thereacross is transmitted to an emitter follower transistor emplifier stage 63, and particularly to the base electrode 64 thereof. The output of stage 63 is passed along transistor amplifier stage 65 to the emitter electrode 66 thereof, across commonly connected emitter load resistor 67. The base electrode 68 of stage 65 has its bias altered by variable resistor 68a which is connected to a positive voltage source so as to change the gain characteristics of the said stage 65. The output of stage 65, via collector electrode 69 thereof, is fed to transistor amplifier stages 70 and 71, each cascade connected in the usual fashion.

The output of stage 71, via collector electrode 72 thereof, is fed to a relay load circuit 73 comprising relay load coil 74, across which a damping diode 75 is connected, and a single pole 77 double-throw (contacts 78, 79) type relay switch 76. The relay contacts have one element thereof 78 normally connected or closed and the other contact 79 normally open (disconnected). The relay 73 is disposed to remain in a fixed or quiescent state when energized, via output stage 71, with a predetermined current level as set by variable resistor 68a, this threshold value being determined for a desired ultraviolet irradiation content in the liquid to be purified. However, if the irradiation value deviates from its desired value, the relay will become operative in that the normally closed contact 78 will open, and normally open contact 79 will close.

In operation, power switch 80 is closed so as to connect the power transformer 81 to the power source lines 82, 83 and thereby develop the necessary supply voltages previously discussed with respect to FIG. 1. An input line voltmeter 80a is provided in the circuit. A time delay relay 82, when power switch 80 is closed, is placed across the power line.

After a predetermined time period, contact 83a will close causing lamp 84 to function so as to give an indication that the system is normally functioning. If, however, the irradiation level of the ultraviolet light in the liquid being purified deviates from the norm, relay 73 functions so as to cause contact 78 to open and contact 79 to close. An audio alarm or buzzer device 84a, via conductor 85, is connected to the contact 79 and across the power line to give a signal that the system is not functioning normally. Also, an indicator light 86, connected to the said contact 79, is placed across the power lines and energized to give a non-functioning or mal-functioning signal.

The foregoing provides an indication for deviations from the normal, but such a system can also provide for relief where the power source fails or is non-functioning. The failure of power from lines 82, 82a will automatically place auxiliary power lines 87, 88 into operation via contact 79 of relay 73. A power failure will cause the relay 73 to operate and contact 79 to close. This places the power transformer 81 across the auxiliary power lines 87, 88 and permits the system to continue to operate. Hence, the system is completely automatic in that any deviation from the norm produces a restoring effect and/or a signal indication for corrective purposes.

Figure 3:
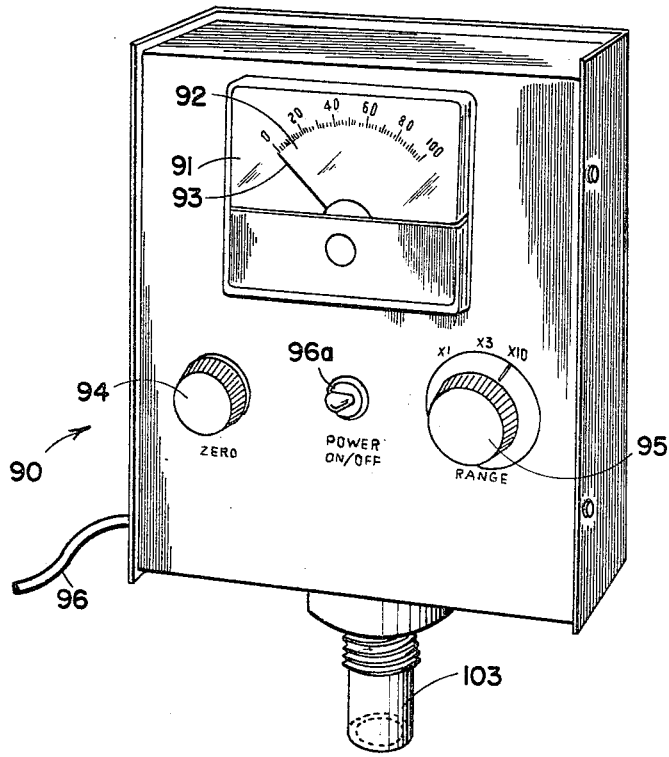
FIG. 3 is a representative case or housing of a meter containing components according to FIG. 1.

FIG. 3 is a representative case or housing generally indicated by the reference numeral 90 containing components according to FIG. 1. On the front face of housing 90 there is seen the front portion of the utraviolet intensity meter 91 having a dial 92 calibrated from 0 to 100 and a pointer 93. In this instance, the meter has a peak response at 2537 angstroms wavelengths. The meter has a zero adjustment 94, and a three range selector switch 95 for 0–1,000, 0–3,000, or 0–10,000 microwatts per square centimeter readings. Other sensitivity ranges may be provided. In this embodiment the ultraviolet irradiation detector or sensor 103 is generally indicated in FIG. 1 by the reference numeral 1.

To install the meter on, for example, an ultraviolet water purifier, the remote sensor 103 is positioned and connected perpendicular to the ultraviolet lamp (not shown). The meter, by means of the power cord 96, is plugged to the power source. The meter ultraviolet power source switch 96a is turned on and the meter zeroed with zero control switch 94 and the range selector 95 placed in the X10 position. The ultraviolet source is then plugged in and allowed a 60 second warm-up. The ultraviolet intensity reading is taken and recorded on an ultraviolet meter reading log. The meter is turned off when not in use.

Figure 4:
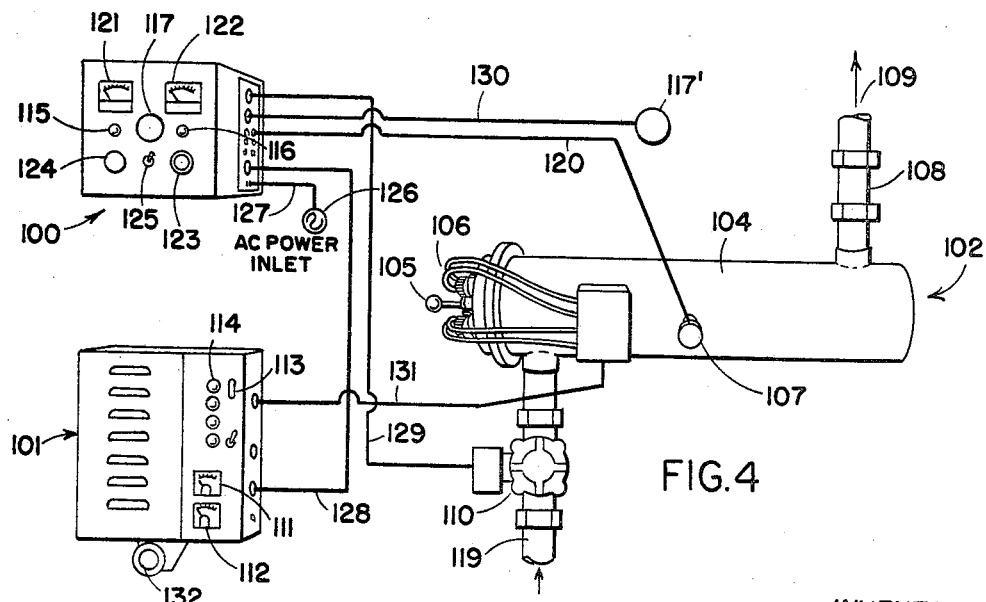
FIG. 4 is a schematic diagram of an electronically liquid purification system having a monitor containing components according to FIG. 2.

FIG. 4 is a schematic diagram of an electronically monitored liquid purification system embodying a monitor control according to an embodiment of the invention, generally indicated by the numeral 100. By way of example, monitor control 100 is shown connected to a remote power supply 101, an ultraviolet ray irradiating liquid purifier 102 and a shut-off valve 110.

The liquid purifier may be substantially of the type disclosed in the aforementioned co-pending application Ser. No. 572,644 and described therein. With reference to the liquid purifier 102 shown in the schematic diagram, it comprises a purifier chamber 104, multiple wiper assembly 105 operated by a simple short pull-push operation to keep the quartz jackets, enveloping the ultraviolet lamps, 106, clean, a sight port and remote sensor 107, flow control valve 108 on purified liquid outlet 109, to regulate the gallons per minute, solenoid shut-off valve 110 to prevent contamination of purified service line in the event of electrical failure or decrease in ultraviolet ray emission below desired minimum.

In the schematic of the remote power supply 101, there is depicted a voltmeter 111 and ammeter 112, an electrical ultraviolet lamp life indicator 113, ultraviolet pilot lights 114 for each lamp circuit.

The monitor control 100 in FIG. 4 generally indicated by the reference numeral 100, contains components according to FIG. 2. In this embodiment the ultraviolet irradiation detector or sensor 107 is generally referred to by the reference numeral 51 in FIG. 2. This unit contains certain control features in addition to the features depicted in FIGS. 1 and 3. The basic pick up or detection amplification and measuring of the 2537 angstrom units intensity is substantially the same as in FIG. 1. Unit 100 is a "fail-safe" monitor which combines 2537 angstrom units ultraviolet sensing and visual readout with low level trigger circuit for automated operation of solenoid cut-off or switch to stand-by operation, and activation of visual and audio alarms. It provides flow delay during start-up to permit ultraviolet lamps to reach peak efficiency. The expanded circuitry (FIG. 2) used in the monitor control 100 (FIG. 4) is required to operate the low level monitor control circuit, which is relay-controlled and operates the separately colored, for example, green and red go and no-go indicator lights 115, 116, the alarms 117 and 117′, solenoid shut-off valve 110 connected in the untreated liquid inlet 119, and the auxiliary outlet for fully automatic opeartion. This control circuit includes stages 63, 65, 70 and 71 (FIG. 2). The green pilot light 115 indicates if the system is operating properly. The red light 116 and the built in audio horn 117 and auxiliary external audio alarm 117′ indicate or denote any malfunction of the system. Monitor control 100 is provided with the remote calibrated sensor 107 (disposed on purifier 102) connected by transmission conductor means 120; it may be designed to receive a plurality of such remote sensors for multiple installations. Unit 100 is further provided with ultraviolet intensity meter 121 filtered and calibrated, in this instance, for 2537 angstrom units wave length, input voltmeter 122, range selector 123 for monitoring various purifying chambers 104 (where there is more than one chamber), zero control switch 124, and ultraviolet power switch 125. The reference numeral 126 indicates the AC power inlet to which the unit 100 is connected by conductor means 127. Unit 100 is connected to remote power supply 101 by conductor means 128T; to shut-off valve 110 by conductor means 129; to external alarm by conductor means 130. Purifier 102 is connected to power supply 101 by conductor means 131. Power supply 101 is provided with a blower 132. Shut-off valve 110 is interchangeable and may be connected in the flow control 108 at the outlet 109.

While the invention has been described and illustrated with respect to a certain particular preferred embodiment which gives satisfactory results, it will be understood by those skilled in the art, after understanding the principle of the invention, that various changes and modifications may be made without departing from the spirit and scope of the invention and it is intended therefore in the appended claims to cover all such changes and modifications.

What is claimed is:

1. An ultraviolet light irradiation detection system for monitoring and measuring ultraviolet light irradiation in a fluid undergoing purification, comprising: an electron discharge device in proximity to said fluid and responsive to ultraviolet light irradiation for producing electrical pulse signals indicative of a predetermined magnitude of said irradiaton; a unijunction transistor connected to said electron discharge device for receiving and amplifying said electrical pulse signals to a predetermined level indicative of the normal ultraviolet irradiation content in said fluid; pre-amplifier means connected to said unijunction transistor for further amplifying said pulse signals; adjustment means for adjusting the output amplitude of said pulse signals amplified by said pre-amplifier means; push-pull amplifying means connected to the output of said pre-amplifier means; recording means connected to said push-pull amplifying means for recording the signal output of said push-pull amplifying means; power supply means for converting alternating current into direct current applicable to said unijunction transistor and said amplifying means; means responsive to signal deviation from said predetermined normal signal levels for producing audible and visual indications indicative of non-normal ultraviolet light irradiation content in the fluid undergoing purification; and means for restoring the system to its normal functioning capability, whereby said audible and visual indications are produced when said ultraviolet light irradiation deviates from said predetermined magnitude of irradiation.

2. A detection system according to claim 1 and wherein said electron discharge device includes an ultraviolet ray detector having a peaked spectral response in the area of substantially 2537 angstroms.

3. A detection system according to claim 1 and wherein said recording means includes a metering circuit selectively disposed to measure different levels of irradiation content.

4. A detection system according to claim 1 and wherein said means responsive to signal deviation further comprises a relay load circuit consisting of a relay connected amplifier biased at a level comparable to the desired normal signal and disposed when the signal is not normal to trip the relay and permit visual and audible indicators to function accordingly.

5. A detection system according to claim 4 and wherein said relay is further disposed to interpose an auxiliary power supply source in response to said signal deviation for restoring the system to its normal operating capability.

References Cited

UNITED STATES PATENTS

| | | | |
|---|---|---|---|
| 3,182,193 | 5/1965 | Ellner et al. | 250—45 X |
| 3,286,185 | 11/1966 | Gilbert | 250—83.3 |
| 3,247,413 | 4/1966 | Bisso et al. | 250—83.3 |
| 3,230,467 | 1/1966 | Atherton et al. | 330—15 |
| 3,317,741 | 5/1967 | McClain | 307—64 |
| 1,190,769 | 7/1916 | Jurist | 250—47 X |
| 2,857,520 | 10/1958 | Wilgen | 250—45 |

RALPH G. NILSON, Primary Examiner

D. L. WILLIS, Assistant Examiner

U.S. Cl. X.R.

21—102; 250—45, 83.3